(12) United States Patent
Kawasoe et al.

(10) Patent No.: US 9,853,327 B2
(45) Date of Patent: Dec. 26, 2017

(54) NONAQUEOUS ELECTROLYTE SECONDARY BATTERY

(71) Applicant: GS Yuasa International Ltd., Kyoto-shi, Kyoto (JP)

(72) Inventors: Yudai Kawasoe, Kyoto (JP); Kenta Nagamine, Kyoto (JP); Keisuke Anami, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 0 days.

(21) Appl. No.: 15/069,463

(22) Filed: Mar. 14, 2016

(65) Prior Publication Data
US 2016/0276708 A1    Sep. 22, 2016

(30) Foreign Application Priority Data
Mar. 16, 2015 (JP) .................... 2015-052100

(51) Int. Cl.
*H01M 6/16* (2006.01)
*H01M 10/0567* (2010.01)
*H01M 10/0569* (2010.01)

(52) U.S. Cl.
CPC ... *H01M 10/0567* (2013.01); *H01M 10/0569* (2013.01); *H01M 2220/20* (2013.01); *H01M 2300/0025* (2013.01)

(58) Field of Classification Search
CPC ......... H01M 10/0569; H01M 10/0567; H01M 2300/0025; H01M 2220/20
See application file for complete search history.

(56) References Cited

U.S. PATENT DOCUMENTS

| 2007/0148541 | A1 | 6/2007 | Ushio |
| 2009/0017374 | A1 | 1/2009 | Saito |
| 2013/0045419 | A1* | 2/2013 | Chun .................... H01M 4/134 429/217 |

FOREIGN PATENT DOCUMENTS

| JP | 2007188861 A2 | 7/2007 |
| JP | 2008140683 A2 | 6/2008 |
| JP | 2009038018 A2 | 2/2009 |
| JP | 2014022335 A2 | 2/2014 |
| JP | 2014086221 A2 | 5/2014 |
| JP | 2014110122 A2 | 6/2014 |

* cited by examiner

*Primary Examiner* — Jane Rhee
(74) *Attorney, Agent, or Firm* — Rankin, Hill & Clark LLP

(57) ABSTRACT

A nonaqueous electrolyte secondary battery includes a positive electrode, a negative electrode and an electrolyte solution, wherein the negative electrode includes a negative active material layer, the electrolyte solution contains fluoroethylene carbonate, and when a content (mg) of the fluoroethylene carbonate is denoted as X and a reaction area ($m^2$) of the negative active material layer is denoted as Y, X and Y satisfy a relation of $10 \leq (X/Y) \leq 100$.

13 Claims, 3 Drawing Sheets

NONAQUEOUS ELECTROLYTE SECONDARY BATTERY

CROSS-REFERENCE TO RELATED APPLICATIONS

This application claims the benefit of Japanese patent application No. 2015-052100 filed on Mar. 16, 2015, which is incorporated by reference.

FIELD

The present invention relates to a nonaqueous electrolyte secondary battery.

BACKGROUND

A nonaqueous electrolyte secondary battery (hereinafter, referred to simply as "secondary battery") is in widespread use as a power supply for mobile devices such as mobile phones, PHSs (Personal Handyphone System), and compact computers because of its high energy density. Further, in recent years, a secondary battery receives attention as a power supply for automobiles such as PHEV (plug-in hybrid electric vehicles), HEV (hybrid electric vehicles) and EV (electric vehicles).

A life required for secondary batteries for mobile devices is about several years; however, a life of 10 years or more, which corresponds to a life of an automobile body is required for an automobile secondary battery. Therefore, a recent demand for an extended life of a secondary battery is high, and an improvement of cycle characteristics of a secondary battery for extending a life has been actively studied.

As a technology for improving the cycle characteristics of a secondary battery, for example, a technology of adding an additive to an electrolyte solution is disclosed in JP-A-2007-188861, JP-A-2008-140683 and JP-A-2014-22335.

Specifically JP-A-2007-188861 discloses that when 4-fluoro-1,3-dioxolan-2-one (FEC) is added to an electrolyte solution, a coating can be formed on a negative electrode, and the diffusion and acceptance of lithium ions in the negative electrode are improved. As a result, precipitation of a lithium metal in the negative electrode is suppressed, and consequently cycle characteristics are improved.

JP-A-2008-140683 and JP-A-2014-22335 disclose that when a coating is formed on a negative electrode by addition of FEC, the decomposition reaction of an electrolyte solution in the negative electrode is inhibited to thereby suppress a reduction in capacity (available capacity). As a result, cycle characteristics are improved.

However, the cycle characteristics of a secondary battery are not always improved only by adding FEC to an electrolyte solution. It has been required to provide a secondary battery having high cycle characteristics more reliably.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention is to provide a nonaqueous electrolyte secondary battery having high cycle characteristics.

A nonaqueous electrolyte secondary battery according to an aspect of the present invention includes a positive electrode, a negative electrode and an electrolyte solution, wherein the negative electrode includes a negative active material layer, the electrolyte solution contains fluoroethylene carbonate, and when a content (mg) of the fluoroethylene carbonate is denoted as X and a reaction area ($m^2$) of the negative active material layer is denoted as Y, X and Y satisfy a relation of $10 \leq (X/Y) \leq 100$.

BRIEF DESCRIPTION OF DRAWINGS

The foregoing and other features of the present invention will become apparent from the following description and drawings of an illustrative embodiment of the invention in which.

DESCRIPTION OF EMBODIMENTS

A nonaqueous electrolyte secondary battery according to an aspect of the present invention includes a positive electrode, a negative electrode and an electrolyte solution, wherein the negative electrode includes a negative active material layer, the electrolyte solution contains fluoroethylene carbonate, and when a content (mg) of the fluoroethylene carbonate is denoted as X and a reaction area ($m^2$) of the negative active material layer is denoted as Y, X and Y satisfy a relation of $10 \leq (X/Y) \leq 100$.

A nonaqueous electrolyte secondary battery according to another aspect of the present includes a positive electrode, a negative electrode and an electrolyte solution, wherein the negative electrode includes a negative active material layer, the electrolyte solution contains fluoroethylene carbonate, and when a content (mg) of the fluoroethylene carbonate is denoted as X and a reaction area ($m^2$) of the negative active material layer is denoted as Y, the electrolyte solution is formed so as to satisfy a relation of $10 \leq (X/Y) \leq 100$ in preparing the nonaqueous electrolyte secondary battery.

The nonaqueous electrolyte secondary battery according to an aspect of the present invention has high cycle characteristics.

Hereinafter, the nonaqueous electrolyte secondary battery according to an aspect of the present invention will be described with reference to drawings.

Figure 1:
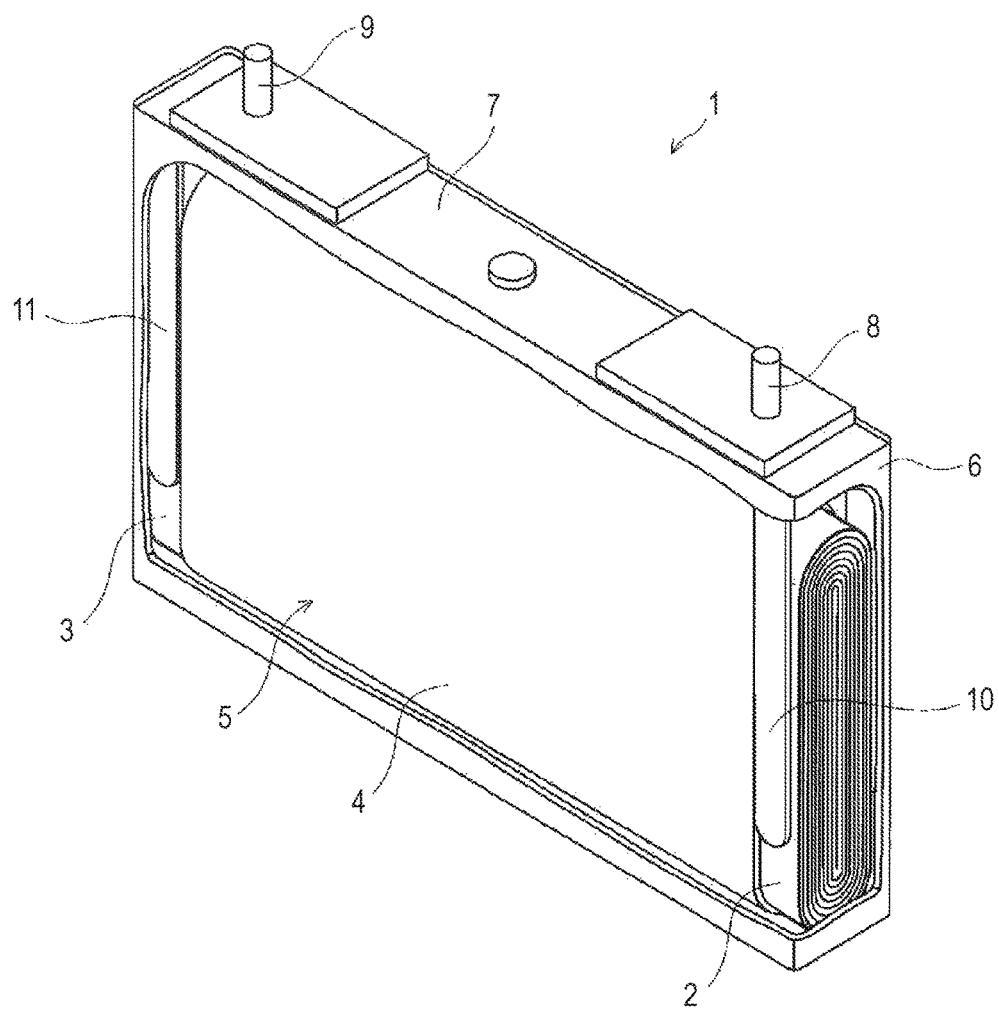
FIG. 1 is a partially broken perspective view showing a schematic configuration of a nonaqueous electrolyte secondary battery according to an aspect of the present invention.

FIG. 1 is a partially broken perspective view showing a schematic configuration of the nonaqueous electrolyte secondary battery according to an aspect of the present invention. As shown in FIG. 1, a nonaqueous electrolyte secondary battery 1 (hereinafter, referred to simply as "secondary battery 1") includes a power generating element 5 which is formed by winding a positive electrode 2 and a negative electrode 3 with a separator 4 sandwiched therebetween. The power generating element 5 is housed in a battery case 6 with the separator 4 impregnated with an electrolyte solution. The battery case 6 has a form of almost a box provided with an opening on its upper side and the opening is closed by a battery lid 7. The battery lid 7 is provided with a positive electrode terminal 8 and a negative electrode terminal 9. The positive electrode terminal 8 is electrically connected to the positive electrode 2 through a positive electrode lead 10 and the negative electrode terminal 9 is electrically connected to the negative electrode 3 through a negative electrode lead 11, respectively.

(Positive Electrode)

The positive electrode 2 is prepared by forming a positive active material layer on both surfaces of a band-shaped positive current collector. As the positive current collector, for example, a metal foil such as an aluminum foil is used. The positive active material layer contains a positive active material capable of absorbing/releasing lithium ions.

As the positive active material, transition metal oxides which absorbs/releases lithium, such as composite oxides represented by a composition formula $Li_xMO_2$, $Li_yM_2O_4$ and $Na_xMO_2$ (wherein, M is one or more kinds of transition metals, $0 \leq x \leq 1$, $0 \leq y \leq 2$); metallic chalcogenide having a tunnel structure or a layered structure; and metal oxides, can be used. Specific examples thereof include $LiCoO_2$, $LiNiO_2$, $LiNi_{1/2}Mn_{1/2}O_2$, $LiNi_{1/3}Mn_{1/3}Co_{1/3}O_2$, $LiCo_xNi_{1-x}O_2$, $LiMn_2O_4$, $Li_2Mn_2O_4$, $MnO_{c2}$, $FeO_2$, $V_2O_5$, $V_6O_{13}$, $TiO_2$, $TiS_2$ and the like.

An additive such as a binder, a conducting agent, a thickener or a filler may be added to the positive active material. As the binder, polyvinylidene fluoride, styrene-butadiene rubber, carboxymethyl cellulose, polytetrafluoroethylene, polyethylene, polypropylene, polyacrylonitrile, ethylene-propylene-diene terpolymer (EPDM), sulfonated EPDM, fluororubber, vinylidene fluoride-hexafluoropropylene copolymer and the like may be used singly, or may be used as a mixture of two or more thereof. As the conducting agent, conductive inorganic compounds such as carbon materials, metals and conductive ceramic; and conductive organic compounds such as conductive polymers can be used.

(Negative Electrode)

The negative electrode 3 is prepared by forming a negative active material layer on both surfaces of a band-shaped negative current collector. As the negative current collector, for example, a metal foil such as a copper foil is used. The negative active material layer contains a negative active material capable of absorbing/releasing lithium ions.

As the negative active material, carbon materials such as graphite (scaly graphite, flake graphite, earthy graphite, natural graphite, artificial graphite), acetylene black, carbon black, cokes, activated carbon, fullerene and carbon nanotubes; alloys of lithium and aluminum, silicon, lead, tin, zinc, cadmium or the like; lithium nitrides such as $Li_5$ ($Li_3N$); metal lithium; and metal oxides such as $LiFe_2O_3$, $WO_2$, $MoO_2$, $SiO$ and $CuO$ may be used singly, or may be used as a mixture of two or more thereof.

An additive such as a binder, a conducting agent, a thickener or a filler may be added to the negative active material. As the binder, polyvinylidene fluoride, styrene-butadiene rubber, carboxymethyl cellulose, polytetrafluoroethylene, polyethylene, polypropylene, polyacrylonitrile, ethylene-propylene-diene terpolymer (EPDM), sulfonated EPDM, fluororubber, vinylidene fluoride-hexafluoropropylene copolymer and the like may be used singly, or may be used as a mixture of two or more thereof. As the conducting agent, conductive inorganic compounds such as metals and conductive ceramic; and conductive organic compounds such as conductive polymers can be used.

A reaction area ($m^2$) of the negative active material layer means a value obtained by multiplying a BET specific surface area ($m^2/g$) of the negative active material layer by a weight (g) of the negative active material layer, as shown in the following [Formula 1].

Reaction area=(BET specific surface area of negative active material layer)×(Weight of negative active material layer)  [Formula 1]

When the additive such as a binder, a conducting agent, a thickener or a filler is added to the negative active material constituting the negative active material layer, the BET specific surface area ($m^2/g$) of the negative active material layer means a BET specific surface area ($m^2/g$) as the entire negative active material layer including the negative active material and the additive.

The weight (g) of the negative active material layer means a weight (g) of the negative active material constituting the negative active material layer. When the additive as described above is added to the negative active material constituting the negative active material layer, the weight (g) of the negative active material layer means a total sum of weights (g) of the negative active material and the additive.

(Separator)

As the separator 4, a microporous membrane mainly composed of a polyolefin resin such as polyethylene or polypropylene, or the like is used. The microporous membrane may be used singly as a monolayer membrane, or may be used as a composite membrane formed by combining a plurality of microporous membranes. Further, the microporous membrane may contain additives such as various plasticizers, antioxidants or flame retarders in an appropriate amount.

(Electrolyte Solution)

As the electrolyte solution, a nonaqueous solvent containing 4-fluoro-1,3-dioxolan-2-one (also referred to as FEC, fluoroethylene carbonate) is used. The nonaqueous solvent may contain, as a solvent other than FEC, one or more of chain carbonates such as ethylmethyl carbonate (EMC), dimethyl carbonate (DMC), diethyl carbonate (DEC) and diphenyl carbonate; cyclic carbonates such as ethylene carbonate, propylene carbonate, butylene carbonate, chloroethylene carbonate, vinylene carbonate, styrene carbonate, catechol carbonate, vinyl ethylene carbonate, 1-phenylvinylene carbonate and 1,2-diphenylvinylene carbonate; cyclic esters such as γ-butyrolactone, γ-valerolactone and propiolactone; chain esters such as methyl acetate and methyl butyrate; ethers such as 1,3-dioxane, dimethoxyethane, diethoxyethane, methoxyethoxyethane and methyl diglyme; nitriles such as acetonitrile and benzonitrile; tetrahydrofuran or derivatives thereof, and dioxolane or derivatives thereof. In addition, in place of fluoroethylene carbonate, 4,4-difluoro-1,3-dioxolan-2-one (4,4-difluoroethylene carbonate), cis-4,5-difluoro-1,3-dioxolan-2-one 4 (cis-4,5-difluoroethylene carbonate), trans-4,5-difluoro-1,3-dioxolan-2-one 4 (trans-4,5-difluoroethylene carbonate), trifluoroethylene carbonate, or tetrafluoroethylene carbonate may be used.

An electrolyte salt may be dissolved in the electrolyte solution. As the electrolyte salt, a lithium salt which is stable in a wide potential region, and the like can be used. Specifically, lithium salts such as $LiPF_6$, $LiPF_2(C_2O_4)_2$ and $LiPF_4(C_2O_4)$, $LiClO_4$, $LiBF_4$, $LiAsF_6$, $LiCF_3CO_2$, $LiCF_3(CF_3)_3$, $LiCF_3(C_2F_5)_3$, $LiC(CF)_3$, $LiC(C_2F)_3$, $LiCF_3SO_3$, $LiC(SO_2CF_3)_3$, $LiC(SO_2C_2F_5)_3$, $LiN(SO_2CF_3)_2$, $LiN(SO_2CF_2CF_2$, $LiN(SO_2CF_3)(SO_2C_4F_9)$, $LiN(COCF_3)_2$, $LiN(COCF_2CF_3)_2$, $LiPF_3(CF_2CF_3)_3$, $LiB(C_2O_4)_2$ and $LiBF_2(C_2O_4)$ may be used singly, or may be used as a mixture of two or more thereof.

The electrolyte solution may contain, as required, an additive such as a coating forming agent for a negative electrode, a positive electrode protection agent or an overcharging inhibitor in addition to the nonaqueous solvent and the electrolyte salt. As the additive, an additive commonly used in nonaqueous electrolyte secondary batteries can be used, and examples thereof include vinylene carbonate, succinic anhydride, biphenyl, cyclohexylbenzene, 2,4-difluoroanisol, propane sultone, propene sultone and the like. These additives may be used singly, or may be used as a mixture of two or more thereof. Further, the contents of these additives in the electrolyte solution are not particularly limited and may be appropriately set according to the kind of the additive or the like. Examples of the content include 5% by mass or less, preferably 0.01 to 5% by mass, and more preferably 0.2 to 5% by mass.

EXAMPLES

Secondary batteries of Examples 1 to 8 and Comparative Examples 1 and 2 shown in Table 1 were prepared. Each of the secondary batteries has a configuration based on the secondary battery 1 according to an aspect of the present invention and is a prismatic nonaqueous electrolyte secondary battery with a design capacity of 1000 mAh. The secondary batteries, as shown in Table 1, are different in weight (g) of electrolyte solution, content percentage (% by weight) of FEC in electrolyte solution, BET specific surface area ($m^2/g$) of negative active material layer, weight (g) of negative active material layer, content percentage (% by weight) of EMC in electrolyte solution, and the like. Therefore, the secondary batteries are different in content X (mg) of FEC, reaction area Y ($m^2$) and (X/Y).

Each secondary battery has basically the same constitution except for constitutions shown in Table 1, and a positive electrode, a negative electrode, a separator and an electrolyte solution are prepared as follows.

In preparation of the positive electrode, first, a positive paste was prepared which contains $LiNi_{1/3}Mn_{1/3}Co_{1/3}O_2$, acetylene black and polyvinylidene fluoride in a weight ratio of 90:5:5 (in terms of solid content) and N-methylpyrrolidone as a solvent. Next, the positive paste was applied onto both surfaces of a positive current collector formed of a band-shaped aluminum foil and dried to form a positive active material layer on both surfaces of the positive current collector, and the resulting product is used as a positive electrode.

In preparation of the negative electrode, first, a negative paste was prepared which contains graphite, styrene-butadiene rubber and carboxymethyl cellulose in a weight ratio of 95:2:3 (in terms of solid content) and water as a solvent. Next, the negative paste was applied onto both surfaces of a negative current collector formed of a band-shaped copper foil and dried to form a negative active material layer on both surfaces of the negative current collector, and the resulting product is used as a negative electrode. A BET specific surface area of the negative active material layer was adjusted so as to have a value shown in Table 1 by adding active materials having different average particle sizes. A weight of the negative active material layer was adjusted so as to have a value shown in Table 1 by adjusting an application amount of the paste.

The BET specific surface area shown in Table 1 was determined by a nitrogen adsorption method using TriStar 3000 (manufactured by Micromeritics). In the present example, a multi-point method (plotting 5 points) was employed, and measurement was performed in the range of 0.05 to 0.20 of relative vapor pressure. A weight of a sample cut out into a size of 80 $cm^2$ was measured, and the sample was held at 120° C. for 1 hour in a vacuum environment for drying, and then measured.

As the separator, an $Al_2O_3$-coated polyethylene separator was used.

As the electrolyte solution, a solution obtained by dissolving $LiPF_6$ at a concentration of 1.0 mol/l in a nonaqueous solvent composed of FEC and EMC was used. The content percentage (% by weight) of FEC and the content percentage (% by weight) of EMC in the electrolyte solution of each secondary battery are as shown in Table 1.

TABLE 1

| | Weight of electrolyte solution (g) | Content percentage of FEC (% by weight) | Content of FEC X (mg) | BET specific surface area ($m^2/g$) | Weight of negative active material layer (g) | Reaction area Y ($m^2$) | X/Y | Capacity retention ratio after 500 cycles (%) | Content percentage of EMC (% by weight) | FEC/EMC (weight ratio) |
|---|---|---|---|---|---|---|---|---|---|---|
| Comparative Example 1 | 3.60 | 0.0 | 0 | 3 | 3.0 | 9.0 | 0.0 | 0.0 | 86.3 | 0.000 |
| Example 1 | 3.60 | 2.5 | 90 | 3 | 3.0 | 9.0 | 10.0 | 77.0 | 84.1 | 0.030 |
| Example 2 | 3.60 | 5.0 | 180 | 3 | 3.0 | 9.0 | 20.0 | 80.0 | 82.0 | 0.061 |
| Example 3 | 2.91 | 6.2 | 180 | 3 | 3.0 | 9.0 | 20.0 | 75.0 | 80.4 | 0.077 |
| Example 4 | 3.96 | 6.2 | 246 | 3 | 3.3 | 9.9 | 24.8 | 79.0 | 80.4 | 0.077 |
| Example 5 | 3.60 | 7.5 | 270 | 3 | 3.0 | 9.0 | 30.0 | 78.0 | 79.8 | 0.094 |
| Example 6 | 2.91 | 12.2 | 355 | 3 | 3.0 | 9.0 | 39.4 | 77.0 | 74.6 | 0.164 |
| Example 7 | 3.96 | 12.2 | 483 | 3 | 3.3 | 9.9 | 48.8 | 72.0 | 74.6 | 0.164 |
| Example 8 | 3.96 | 23.0 | 911 | 3 | 3.3 | 9.9 | 92.0 | 50.8 | 62.3 | 0.369 |
| Comparative Example 2 | 3.96 | 34.0 | 1346 | 3 | 3.3 | 9.9 | 136.0 | 10.0 | 53.7 | 0.633 |

(Evaluation of Capacity Retention Ratio)

Next, a capacity retention ratio after 500 cycles of each secondary battery prepared was evaluated. An initial capacity and a capacity after a cycle test of each secondary battery were measured.

For determining the initial capacity of each secondary battery, constant current-constant voltage charge was performed at a temperature of 25° C. for 3 hours with a current of 1.0 CmA and a voltage of 4.35 V. Then constant current discharge was performed at a temperature of 25° C. with a current of 1.0 CmA and an end voltage of 2.75 V, and finally a discharge capacity was measured. Each discharge capacity measured was defined as an initial capacity (initial available capacity) of each secondary battery.

For determining the capacity after a cycle test of each secondary battery, a process of performing constant current-constant voltage charge with a current of 1.0 CmA and a voltage of 4.35 V at a temperature of 45° C. for 3 hours and then performing constant current discharge with a current of 1.0 CmA and an end voltage of 2.75 V at a temperature of 45° C. was defined as one cycle. A discharge capacity was measured in the same conditions as in measurement of the initial capacity after repeating this cycle 500 times. Each discharge capacity measured was defined as a capacity after cycle of each secondary battery.

As shown in the following [Formula 2], a ratio (%) of the capacity after cycle to the initial capacity was calculated, and the resulting value was defined as a capacity retention ratio after 500 cycles.

Capacity retention ratio=(Capacity after cycle)/(Initial capacity)×100   [Formula 2]

The capacity retention ratio of each secondary battery is as shown in Table 1. It is determined that the higher the capacity retention ratio is, the higher the cycle characteristics are.

Figure 2:
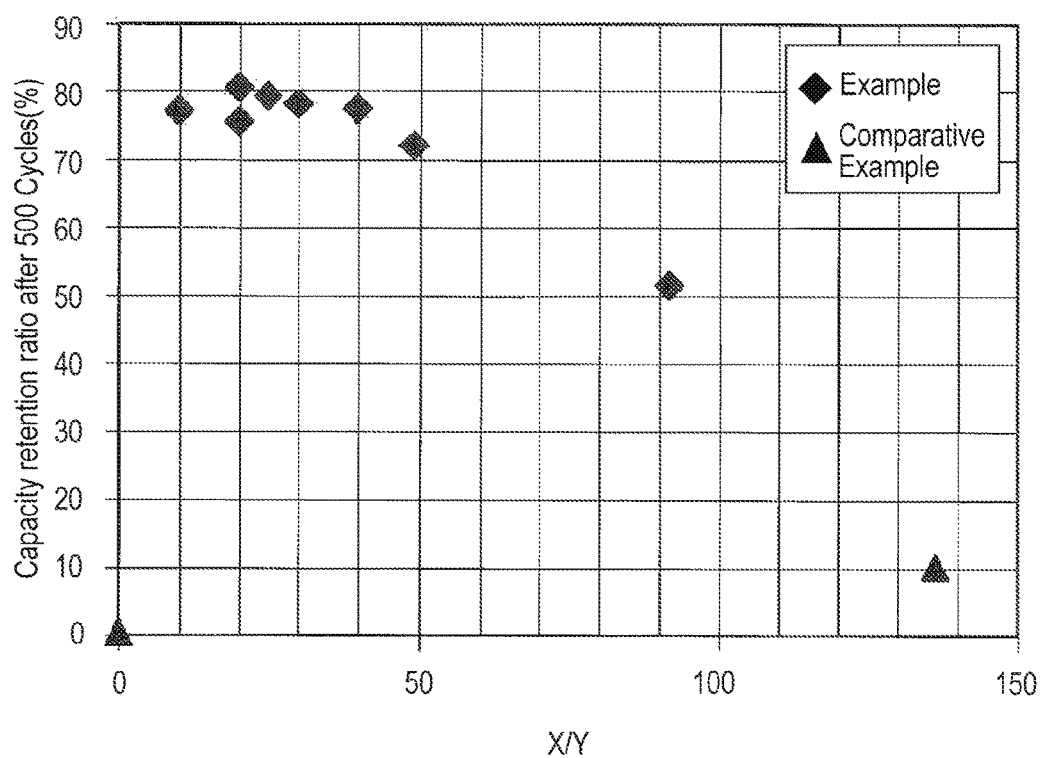
FIG. 2 is a diagram showing a relation between an (X/Y) value and a capacity retention ratio.

As shown in Table 1 and FIG. 2, in Examples 1 to 8 in which the relation of $10 \leq (X/Y) \leq 100$ is satisfied, all of the secondary batteries had a capacity retention ratio of 50% or more. In contrast, in Comparative Examples 1 and 2 in which the relation of $10 \leq (X/Y) \leq 100$ is not satisfied, all of the secondary batteries were low in capacity retention ratio and their capacity retention ratios were 10% or less. From the above-mentioned results, it is said that when the relation of $10 \leq (X/Y) \leq 100$ is satisfied, a reduction in capacity during charge-discharge cycles is suppressed and a secondary battery having high cycle characteristics is obtained.

Further, in Examples 1 to 7, all of the secondary batteries are higher in capacity retention ratio and their capacity retention ratios are 70% or more. Accordingly, when the relation of $10 \leq (X/Y) \leq 50$ is satisfied, the reduction in capacity during charge-discharge cycles is more favorably suppressed and a secondary battery having higher cycle characteristics is obtained. Moreover, when the relation of $10 \leq (X/Y) \leq 40$ is satisfied, the reduction in capacity during charge-discharge cycles is moreover favorably suppressed and a secondary battery having much higher cycle characteristics is obtained.

As described above, the present inventors have found an index of determining whether or not a reduction in capacity can be suppressed. That is, the reduction in capacity can be efficiently suppressed with reliability by adjusting to a specific range the content X of FEC per the reaction area Y of the negative active material layer, so that it is possible to easily prepare a secondary battery having higher cycle characteristics.

The reason why high cycle characteristics can be realized by satisfying such the relation can be supposed as follows.

The first reason is presumed that the conductivity of lithium ions changes in an appropriate range. A part of FEC contained in the electrolyte solution is reductively decomposed gradually due to repeated charge-discharge. If the content of FEC in the electrolyte solution is decreased, the composition of the electrolyte solution also changes, and the ability of dissociating an electrolyte salt into a solvent is deteriorated, so that the ion conductivity of the electrolyte solution is supposed to be deteriorated. Also, if the amount of FEC is more than necessary, the viscosity of the electrolyte solution is increased and the ion conductivity of the electrolyte solution is deteriorated. If the ion conductivity is deteriorated, an electrode reaction in the power generating element becomes nonuniform and local degradation easily occurs, so that the reduction in capacity due to repeated charge-discharge is supposed to proceed. It is supposed that the conductivity of lithium ions changes in an appropriate range by keeping the X/Y value in an appropriate range, and high cycle characteristics can be realized.

The second reason is presumed that FEC contained in the electrolyte solution suppresses the decomposition of a solvent other than the FEC. FEC may be mixed with another solvent for use in consideration of viscosity or ion conductivity. For example, when chain carbonate such as EMC, DEC or DMC is used as the other solvent, the viscosity of the electrolyte solution is reduced so that it is possible to contribute to an improvement in conductivity of lithium ions. However, when the other solvent causes reaction such as reductive decomposition at the negative electrode or oxidative decomposition at the positive electrode, the composition of the electrolyte solution may change. Such a case has an influence on ion conductivity throughout the electrolyte solution, and cycle characteristics are deteriorated. More specifically, for example, a part of EMC changes into DMC or DEC by transesterification or is reductively decomposed on the negative electrode. Because decomposed products of DMC or DEC, and EMC (they are supposed to exist as fragments of various organic substances) are relatively vulnerable to oxidative decomposition, it is supposed that these products are further oxidatively decomposed at the positive electrode. Production of such decomposed products or changes in the composition of the electrolyte solution adversely affects on the viscosity of the electrolyte solution or the dissociation ability of the electrolyte salt, leading to deterioration in conductivity of lithium ions. In particular, when the potential is high, oxidative decomposition of DMC and DEC easily occurs at the positive electrode and such problems become remarkable. However, when a certain amount or more of FEC exists in the electrolyte solution and the reduction potential of the solvent is lower than that of FEC, FEC is reductively decomposed prior to reductive decomposition of the solvent at the negative electrode, so that the solvent is supposed to be hardly decreased due to reductive decomposition, and the cycle characteristics are supposed to be hardly deteriorated. Further, when FEC is added to the electrolyte solution, an SEI film is formed on the negative electrode during a first charge, so that a reaction field of the solvent in the negative electrode becomes small, and other solvents except for FEC are more hardly reductively decomposed. Moreover, even when FEC decreases due to the reductive decomposition reaction and a probability of decomposition of the other solvent relatively increases, the reduction in capacity is supposed to hardly occur in the case where the amount of FEC is within an appropriate range.

That is, in the secondary battery 1 according to an aspect of the present invention, a favorable amount of FEC has been found not only by focusing attention on the composition of the electrolyte solution (content percentage of FEC in the electrolyte solution) as in a conventional manner, but also by focusing attention on the reaction field in the negative electrode. Specifically the relation of $10 \leq (X/Y) \leq 100$ was derived based on an idea that the content X of FEC is defined in relation to the reaction area Y because the reaction field of the reductive decomposition of FEC or a solvent other than the FEC also becomes small if the reaction area Y of the negative active material layer is small. In this way by adjusting a favorable amount of FEC with respect to the reaction area of the negative active material layer, it is possible to provide a secondary battery having high cycle characteristics.

Conventional electrolyte solutions could not achieve high cycle characteristics because they merely contain FEC as an additive in a slight amount. However, in the secondary battery 1 according to an aspect of the present invention, the electrolyte solution contains FEC in a relatively large amount not as an additive but as a nonaqueous solvent and satisfies the relation of $10 \leq (X/Y)$, so that the secondary battery 1 has high cycle characteristics.

Further, even when the content of FEC is the same, the relation of $(X/Y) \leq 100$ is not satisfied in the case where the reaction area Y of the negative active material layer is small. Also in such a case, the electrode reaction in the power generating element becomes nonuniform, resulting in the occurrence of local deterioration, so that the reduction in capacity is supposed to occur.

An applied quantity of the active material layer per one surface of the current collector is not particularly limited and the applied quantity is preferably 0.8 mg/cm$^2$ or more, more preferably 1.0 mg/cm$^2$ or more. When the applied quantity is low, for maintaining an energy density, a density of the active material layer may be increased by lowering a porosity of the active material layer. However, when the porosity of the active material is too small, an uneven dispersion of the porosity in a direction of a thickness of the active material layer is easily occurred, and the electrode reaction easily becomes nonuniform. The quantity of the active material layer per one surface of the current collector is preferably is preferably 2.5 mg/cm$^2$ or less, more preferably 2.2 mg/cm$^2$ or less. A thickness of the active material layer can be increased for increasing the quantity of the active material layer. However, when the thickness of the active material layer is too large, the electrode reaction may become easily nonuniform in the direction of the thickness of the active material layer. Nonuniformity of the electrode reaction may cause the deterioration of the cycle characteristics. Therefore, a range as above-mentioned of the quantity is preferable. More specifically, the quantity of the active material layer per one surface of the current collector is preferably 0.8 mg/cm$^2$ or more and 2.5 mg/cm$^2$ or less, more preferably 1.0 mg/cm$^2$ or more and 2.0 mg/cm$^2$ or less.

With respect to the relation of $10 \leq (X/Y) \leq 100$, the electrolyte solution should be adjusted so as to satisfy the relation in preparing the secondary battery 1, and this makes it possible to allow a certain amount or more of FEC to be present in which the reduction in capacity does not occur even if the amount of FEC is reduced after start of use. Naturally, when the relation is satisfied in the secondary battery 1 after start of use, the reduction in capacity does not occur also in this case and high cycle characteristics are exerted.

The negative active material is not particularly limited. As the negative material, graphite is preferable, and natural graphite is more preferable. A crystallinity of graphite is relatively high. Therefore, an acceptability of ions of the negative active material layer easily becomes low, especially when the thickness of the active material is large. When the acceptability of ions becomes low, the nonuniformity of the electrode reaction easily occurs, and local deterioration easily occurs. However, even when graphite is used, by setting a ratio between the content of FEC and the reaction area of the negative active material layer to the range of the present invention, the local deterioration can be suppressed effectively, and a decrease of the cycle characteristics can be suppressed.

Further, in order to increase energy density per battery, it is supposed to increase the reaction area of the negative active material layer. In this case, as described above, a life of a battery may also be decreased due to an increase of side reaction on the surface of the negative active material. However, even when the reaction area of the negative active material is increased, the reduction in capacity is suppressed and high cycle characteristics are exerted by setting a ratio between the content of FEC and the reaction area of the negative active material layer to the range of the present invention. The BET specific surface area is not particularly limited; however it is preferably 1.0 to 5.0 m$^2$/g, and more preferably 2.5 to 4.0 m$^2$/g.

In the above, the constitution of the secondary battery 1 according to an aspect of the present invention has been specifically described based on the embodiments, but the contents of the present invention are not limited to the aforementioned embodiments. For example, materials, values and the like described in the aforementioned embodiments are merely exemplifications of preferred ones, and the present invention is not limited thereto. Moreover, it is possible to make a modification appropriately to the constitution of the present invention without departing from the scope of technological thought according to the present invention.

Figure 3:
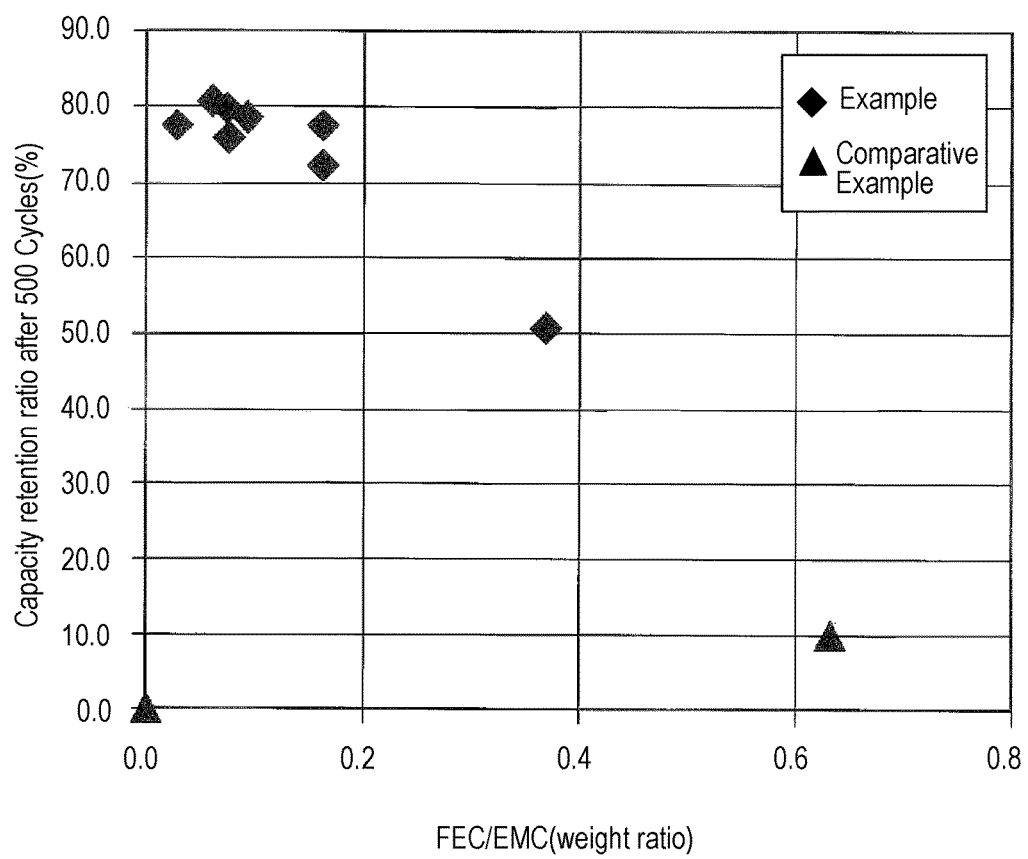
FIG. 3 is a diagram showing a relation between an (FEC/EMC) value and a capacity retention ratio.

FIG. 3 is a diagram showing a relation between a weight ratio of FEC to EMC (FEC/EMC) and a capacity retention ratio. Noting the content percentages (% by weight) of FEC and EMC, as shown in FIG. 3, when FEC is contained in the electrolyte solution and the weight ratio of FEC to EMC is 0.5 or less, the reduction in capacity is remarkably suppressed. Moreover, when the weight ratio of FEC to EMC is 0.2 or less, the reduction in capacity is more remarkably suppressed.

A weight of a compound contained in the electrolyte solution can also be calculated from a battery after production. Specifically, first, a weight of the battery before disassembly is measured. The electrolyte solution is taken out and its weight is measured. Thereafter, the battery is disassembled, and members such as a negative electrode, a positive electrode and a separator to which the electrolyte solution adheres are washed with dimethyl carbonate (DMC). Thereafter, DMC is removed by vacuum-drying, and a weight of the dried battery members is measured. The weight of the dried battery members means a total of members constituting the battery such as cutting scraps generated in disassembling the battery. A weight of the electrolyte solution contained in the battery can be calculated from the difference between the above weight of the battery before disassembly and a sum of the weight of the dried battery members and the weight of the electrolyte solution taken out.

Further, a ratio of the compound contained in the electrolyte solution can be known by analyzing, with a publicly known method (e.g., gas chromatography mass spectroscopy analysis), the electrolyte solution taken out by the aforementioned method.

The present invention is suitable for applications to fields in which particularly high cycle characteristics are required among industrial batteries, and has extremely large industrial availability. The invention is particularly effective as a power supply for automobiles such as PHEV, HEV and EV.

What is claimed is:
1. A nonaqueous electrolyte secondary battery comprising:
a positive electrode;
a negative electrode; and an electrolyte solution, wherein the negative electrode includes a negative active material layer, the electrolyte solution contains fluoroethylene carbonate, and when a content (mg) of the fluoroethylene carbonate is denoted as X and a reaction area (m$^2$) of the negative active material layer is denoted as Y, X and Y satisfy a relation of:

$$10 \leq (X/Y) \leq 100.$$

2. The nonaqueous electrolyte secondary battery according to claim 1, wherein when the content (mg) of the fluoroethylene carbonate is denoted as X and the reaction area (m$^2$) of the negative active material layer is denoted as Y, X and Y satisfy a relation of:

$$10 \leq (X/Y) \leq 50.$$

3. The nonaqueous electrolyte secondary battery according to claim 1, wherein when the content (mg) of the fluoroethylene carbonate is denoted as X and the reaction area (m$^2$) of the negative active material layer is denoted as Y, X and Y satisfy a relation of:

$$10 \leq (X/Y) \leq 40.$$

4. The nonaqueous electrolyte secondary battery according to claim 1, wherein the content of the fluoroethylene carbonate in the electrolyte solution is 12.2% by weight or less.

5. The nonaqueous electrolyte secondary battery according to claim 1, wherein the electrolyte solution contains a solvent having a reduction potential lower than a reduction potential of the fluoroethylene carbonate.

6. The nonaqueous electrolyte secondary battery according to claim 5, wherein the solvent having a reduction potential lower than the reduction potential of the fluoroethylene carbonate is ethyl methyl carbonate.

7. The nonaqueous electrolyte secondary battery according to claim 6, wherein a weight ratio of the fluoroethylene carbonate to the ethyl methyl carbonate is 0.5 or less.

8. The nonaqueous electrolyte secondary battery according to claim 6, wherein a weight ratio of the fluoroethylene carbonate to the ethyl methyl carbonate is 0.2 or less.

9. A nonaqueous electrolyte secondary battery comprising:
a positive electrode;
a negative electrode; and
an electrolyte solution, wherein the negative electrode includes a negative active material layer, the electrolyte solution contains fluoroethylene carbonate, and when a content (mg) of the fluoroethylene carbonate is denoted as X and a reaction area (m$^2$) of the negative active material layer is denoted as Y, the electrolyte solution is prepared so as to satisfy a relation of:

$$10 \leq (X/Y) \leq 100$$

in preparing the nonaqueous electrolyte secondary battery.

10. The nonaqueous electrolyte secondary battery according to claim 1, wherein the negative electrode includes a current collector, and an applied quantity of the active material layer per one surface of the current collector is 0.8 mg/cm$^2$ or more.

11. The nonaqueous electrolyte secondary battery according to claim 1, wherein the negative electrode includes a current collector, and an applied quantity of the active material layer per one surface of the current collector is 1.0 mg/cm$^2$ or more.

12. The nonaqueous electrolyte secondary battery according to claim 1, wherein the negative electrode includes a current collector, and an applied quantity of the active material layer per one surface of the current collector is 2.5 mg/cm$^2$ or less.

13. The nonaqueous electrolyte secondary battery according to claim 1, wherein the negative electrode includes a current collector, and an applied quantity of the active material layer per one surface of the current collector is 2.2 mg/cm$^2$ or less.

* * * * *